United States Patent [19]

Norleen

[11] 4,310,126
[45] Jan. 12, 1982

[54] WINDING APPARATUS FOR PLASTIC LINE

[75] Inventor: Kenneth V. Norleen, Mitchellville, Md.

[73] Assignee: Norco Landscaping & Maintenance Co., Inc., Mitchellville, Md.

[21] Appl. No.: 194,899

[22] Filed: Oct. 7, 1980

[51] Int. Cl.³ .................. B65H 54/02; B65H 57/12; B65H 54/28

[52] U.S. Cl. .................. 242/47; 242/7.01; 242/18 R; 242/20; 242/25 R; 242/85; 242/157.1; 242/158 R

[58] Field of Search .................. 242/47, 48, 49, 53, 242/1, 18 R, 16, 20, 21, 22, 23, 24, 25 R, 54 R, 85, 86, 86.5 R, 86.8, 104, 105, 106, 158 R, 157.1

[56] References Cited

U.S. PATENT DOCUMENTS

| | | |
|---|---|---|
| 170,186 | 11/1875 | Parker . |
| 377,542 | 2/1888 | Willey .................. 242/23 |
| 598,138 | 2/1898 | Cummins .................. 242/86.8 X |
| 666,182 | 1/1901 | Cardwell . |
| 1,657,308 | 1/1928 | Jespersen . |
| 1,766,444 | 9/1932 | Butler . |
| 1,874,206 | 8/1932 | Pierson . |
| 2,492,515 | 12/1948 | Beard . |
| 2,504,947 | 4/1950 | Grange . |
| 3,054,568 | 9/1962 | White . |
| 3,182,926 | 5/1965 | Imhof . |
| 3,514,048 | 5/1970 | Lowery . |
| 3,625,443 | 12/1971 | Knowles . |
| 3,647,155 | 3/1972 | Jorgenson . |
| 3,834,600 | 9/1974 | Benchemoul . |
| 3,901,456 | 8/1975 | Pradier . |
| 3,963,186 | 6/1976 | Van Den . |
| 4,007,886 | 2/1977 | Kamistein . |
| 4,126,281 | 11/1978 | Young .................. 242/53 |
| 4,176,801 | 12/1979 | Douglas . |

Primary Examiner—Stanley N. Gilreath
Attorney, Agent, or Firm—Irvin A. Lavine

[57] ABSTRACT

An apparatus for winding plastic line from a supply reel onto a spool including guide tubing, the discharge end of which is manipulated to lay the line evenly on the spool.

12 Claims, 4 Drawing Figures

WINDING APPARATUS FOR PLASTIC LINE

BACKGROUND OF THE INVENTION

The present invention relates to apparatus for winding plastic line from a supply reel onto a take-up spool.

It is often necessary to acquire relatively large reels of filamentry material and to wind the filamentry material, or line, from the supply reel onto a spool. Such apparatus has, in general, been proposed including a support for the supply reel, a support and drive for a take-up spool, and some guide device or devices for the line between the supply reel and the take-up spool.

Examples of apparatus as above described are shown in Knowles U.S. Pat. No. 3,625,443, Kaminstein U.S. Pat. No. 4,007,886, and Jorgenson U.S. Pat. No. 3,647,155, wherein motor drives are utilized, and there is also known in the prior art a construction of this general type in which the take-up spool is rotated by hand; see Butler U.S. Pat. No. 1,877,444.

The prior art which is known, however, has been deficient in a number of particulars.

Some are of greater complexity, and therefore of greater costs than is desirable. For example, Knowles U.S. Pat. No. 3,625,443 provides for the successive winding of plural take-up spools mounted on the same axis, and further includes a complex control apparatus for causing the line to shift from one take-up spool to the other. In Kaminstein U.S. Pat. No. 4,007,886, there is no provision for the level winding of the line on the take-up spool, resulting in an uneven laying of the line on the take-up spool; Jorgenson U.S. Pat. No. 3,647,155 is similarly deficient. Where there has been provided a level winding mechanism, this has added to the expense and complexity of the apparatus.

In the above mentioned patent to Butler, U.S. Pat. No. 1,877,444, while a comparatively simple device is provided, requiring the manual manipulation of a guide device for laying of a fishing line, the line is laid upon a take-up spool or reel which is hand-driven, thereby requiring considerable dexterity for the simultaneous movement of both hands of the operator. Further, this apparatus provided a complex and expensive take-up spool or reel construction.

Also known in the prior art is Lowery U.S. Pat. No. 3,514,048, directed to a cable feed apparatus for feeding cable as it is wound onto or withdrawn from a drum, there being no disclosure of a pair of spools or reels, the apparatus apparently being intended to pay out cable, and to then rewind cable the thus paid out. This apparatus has a guide tube which is mounted on a disk rotatable about a horizontal axis, but there is no suggestion that the guide tube has any function in connection with level laying of the cable.

SUMMARY OF THE INVENTION

The present invention provides a winding apparatus particularly adapted to wind plastic monofilament line, which has the characteristics of being slippery and relatively stiff. Such line is used in connection with weed cutting implements which rotate a spool on which the line is wound, with a portion of the line extending from the spool, the extending line engaging and cutting weeds or other vegetation.

The present invention provides a winding apparatus for such a plastic line which includes a support for a supply reel of the plastic line, to enable the supply reel to readily rotate. In addition, a support for a conventional spool used in such weed cutting apparatus is provided, including a motor-driven spindle for engagement with one end of the spool, and an axially movable spindle for engaging and clamping the spool between it and the driven spindle. There is provided, in addition, guide tubing which includes, in a preferred embodiment, a terminal tube of U-shape, having a discharge end which may be manually moved generally parallel to the axis of the take-up spool. More particularly, a platform is provided on which the motor and spindles are mounted, the platform also carrying a support for the supply reel. The guide tubing includes a feed tube which extends downwardly through the platform, thence longitudinally beneath the platform and beneath the take-up spool. A coupling is provided between the above noted longitudinally extending feed tube, and the U-shaped terminal tube, which permits the latter to rotate on the axis of the longitudinally extending feed tube. The rotation, effected by manual engagement with the terminal tube, enables the plastic line to be laid relatively level, it being noted that with rapid rotation of the take-up spool, and with the slippery surface of the plastic line, build is not a natural occurrence, and by a small amount of transverse movement of the discharge end of the U-shaped terminal tube, level winding is achieved.

Among the objects of the present invention are the provision of a winding apparatus particularly adapted to the winding of plastic line from a supply reel onto a take-up spool, to provide an apparatus for this purpose which is of extremely simple and economical construction, to provide such an apparatus which will enable the level winding of plastic line on a take-up spool at a rapid rate, and to provide such an apparatus in which level winding is achieved by manual manipulation of a guide tube while the take-up spool is driven by a simple motor, to thereby effect rapid and level winding of the take-up spool.

Other objects and many of attendant advantages of the present invention will be readily understood from the following specification, claims and drawing.

DESCRIPTION OF THE PREFERRED EMBODIMENT

Figure 1:
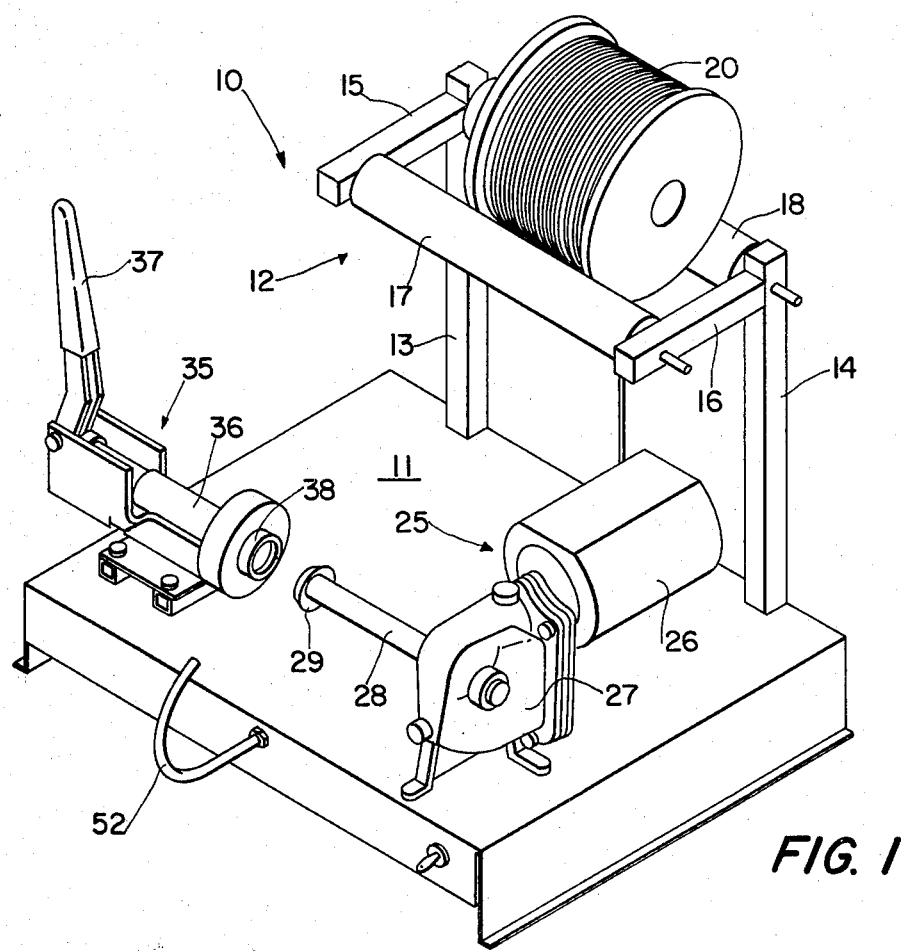
FIG. 1 is a perspective view of winding apparatus in accordance with the present invention.

Referring now to the drawings, wherein like or corresponding reference numerals are used to designate like or corresponding parts throughout the several views, there is shown in FIG. 1 a winding apparatus generally designated 10, and including a platform 11, which is horizontally extending. Supported on the platform 11 is a reel support apparatus 12, which may be seen to include the vertical posts 13 and 14. Arms 15 and 16 extend horizontally from the posts 13 and 14, respectively, the arms 15 and 16 extending forwardly and over the platform 11. Rollers 17 and 18 are supported by the arms 15 and 16, and these rollers rotatably support a supply reel 20 for plastic line. Such plastic line is well known for such purposes as use in weed cutting tools, and is conventionally supplied with a diameter of either 0.065 inch or 0.080 inch; it has a surface having a low coefficient of resistance.

Figure 2:
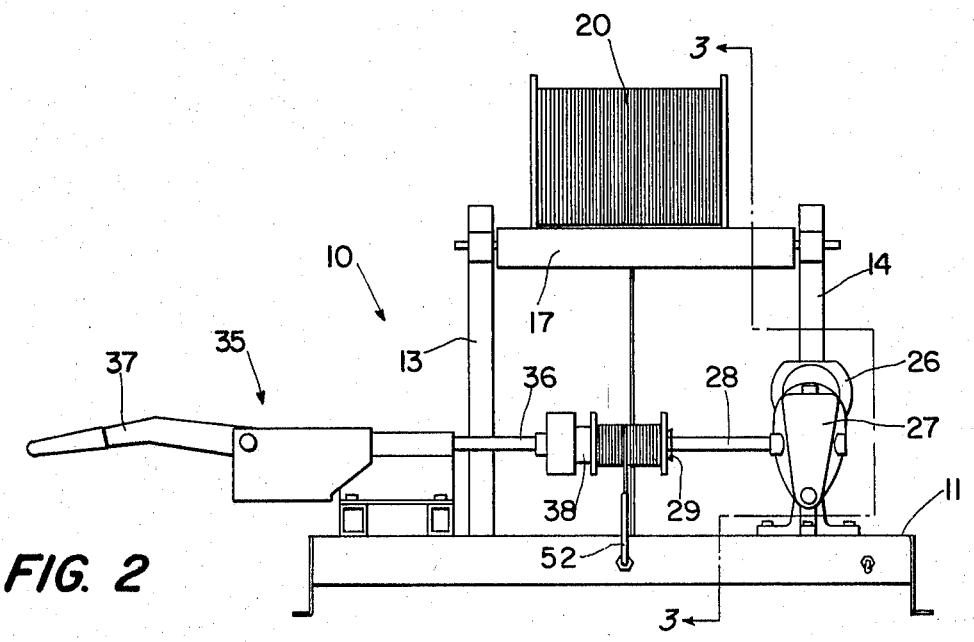
FIG. 2 is an elevational view of the apparatus shown in FIG. 1, with some parts in a different position.

A spool drive apparatus 25 is mounted on the upper surface of the platform 11, and includes an electric motor 26 and a gear transmission 27, the output shaft of the motor 26 serving to drive the gear transmission 27, and there being provided, as shown in FIG. 2, a drive shaft 28 extending from the gear transmission 27, the shaft 28 being generally parallel to the axis of the supply reel 20. On the end of the shaft 28 there is a friction cone 29, for frictional engagement with a spool 30. As it will be understood, the spool 30 is of a well known type, used in weed cutting apparatus, and includes a spindle with a pair of end flanges, and a drive nut on the exterior of one of the flanges, the spindle itself being hollow.

Spaced from and opposite to the shaft 28 is a clamping spindle apparatus 35, including a longitudinally movable spindle 36. Spindle 36 is actuated by a handle 37, moving the spindle axially by a suitable linkage arrangement. Such apparatus is well known, and for purposes of clarity, is not illustrated in detail. The spindle or shaft 36 may, itself, rotate on its own axis, or may support a spool engaging member 38 which is rotatable on the axis of the spindle or shaft 36.

Figure 3:
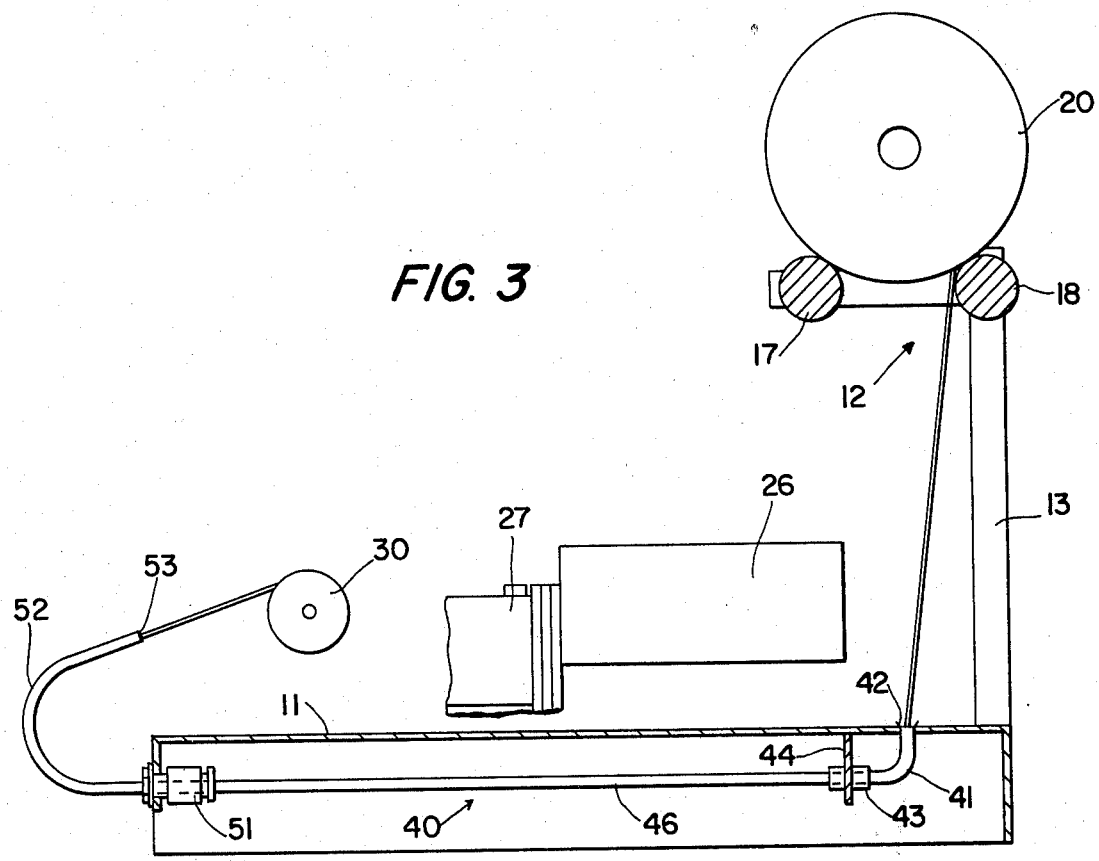
FIG. 3 is a cross-sectional view taken on the line 3—3 of FIG. 2.

Referring now to FIG. 3, there may be seen the platform 11, post 13, arm 15, rollers 17 and 18 and supply reel 20. Guide tube means 40 is supported by the platform 11, and includes a first feed tube 41 which is of elbow-shape, having a flared end 42 adjacent the surface of the platform 11. This elbow terminates at a coupling 43 of known construction, supported by a brace 44 which depends from the under surface of the platform 11. A second feed tube 46 extends longitudinally beneath the platform, from adjacent the rear thereof where the supply reel support apparatus 12 is located, towards the front thereof. A coupling 51 is provided, and extending from the coupling 51 is an arcuate terminal tube 52 having a discharge end 53.

Also shown in FIG. 3 are the motor 26, a portion of the gear transmission 27, and the take-up spool 30; other portions of the apparatus 10 are not shown in FIG. 3, for purposes of clarity.

Figure 4:
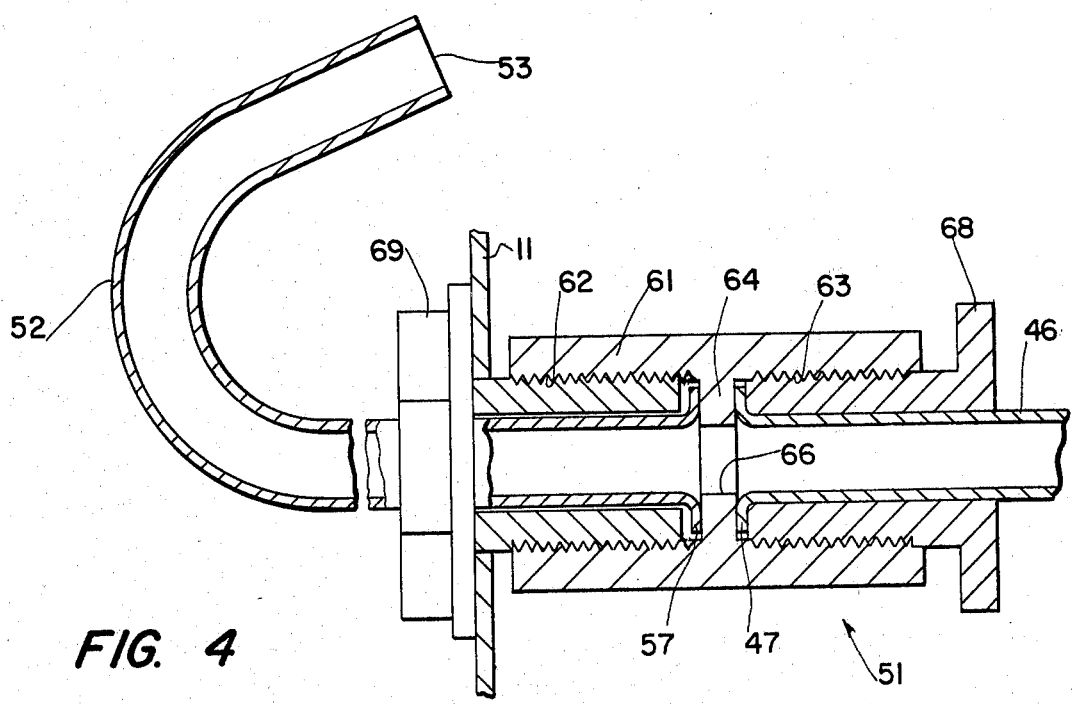
FIG. 4 is an enlarged cross-sectional view of a coupling and related tubing shown in FIG. 3.

Referring now to FIG. 4, there is shown in cross-section the coupling 51, which may be seen to include a tubular body 61 having internal threads 62 and 63 extending from either end, and with a partition 64, having an opening 66 therethrough, partition 64 being located approximately midway between the ends of the body 61. A nut 68 is threadedly engaged in the threads 63, and the tube 46 will be seen to have a flared end 47. Thus, by tightening the nut 68, the flared end 47 will be locked against the partition 64, thereby holding the tube 46 immoveable.

The coupling 51 also includes the nut 69, which engages in the threads 62, and which releasably and controllably engages the flared end 57 of the terminal tube 52. By adjusting the extent to which the nut 69 is threaded into the body 61, the frictional forces on the flared end 57 may be adjusted, thereby providing for adjustment of the resistance to movement of the terminal tube 52 as it rotates on the axis of the tube 46.

As will be seen, the discharge end 53 of the terminal tube 52 will be able to be moved, manually, generally parallel to the axis of the take-up spool 30 as it is rapidly rotated by motor 26.

In use, the supply reel 20, containing plastic line as above described, is placed on the rollers 17 and 18 of support apparatus 12, with the axis of the reel 20 generally parallel to the axes of the rollers 17 and 18. The end of the plastic line is removed from the supply reel 20, and is pushed into the flared end 42 of the first feed tube 41, and due to the relative thickness of the plastic line, it may be fed or pushed through the first feed tube 41, the second feed tube 46, and the arcuate terminal tube 52. Preferably, the feed tubes 41 and 46 are in a plane which is perpendicular to the axes of the rollers 17 and 18. The line exits from the discharge end 53 of the terminal tube 52, and is directed generally towards a take-up spool 30. The axis of take-up spool 30 is, in the embodiment shown, parallel to the axes of the rollers 17 and 18, and a vertical plane through the axis of take-up spool 30 will have the axis of feed tube 46 transverse to it.

As above noted, the terminal tube 52 may be manually moved, by causing the end thereof adjacent flared end 57 to rotate on an axis which is coaxial with the axis of the coupling 51; the discharge end 53 of terminal tube 52 may thus be enabled to move transversely, from side to side as viewed in FIG. 2, generally parallel to the axis of take-up spool 30. Thus, the plastic line may be guided from side to side. The plastic lines will have been attached to the take-up spool 30, previously positioned between the spindle or shaft 36 and the shaft 28, the lever 37 will have been moved to the position in which the take-up spool 30 will have been clamped between the spindles, and the motor 26 will have been energized, as by the closing of a suitable switch. Thus, the take-off spool 30 will have been caused to rotate, and as it does so, side-to-side movement of the line will be effected, by manual movement, as above noted, of the terminal tube 52.

Due to the fact that the plastic line is relatively stiff, it may be pushed, in the manner noted, through the guide tubing, so as to enter the flared end 42 and to exit from the discharge end 53. Further, because of the low coefficient of friction of the surface of the plastic line, a precise laying of the line is not required, and so a manual manipulation, with relatively imprecise movement of terminal tube 52, will be satisfactory. Should the plastic line tend to build up in any one portion of the axial of the take-up spool 30, the low coefficient of friction of the surface will, in conjunction with the ready manual movement of terminal tube 52, cause the plastic line to be laid relatively level, and without significant build-up.

There has been provided a winding apparatus for plastic line, particularly plastic line which is relatively stiff and which has a low coefficient surface friction. Such winding apparatus is of simple construction, and without complex or expensive level winding apparatus. Further, the herein disclosed winding apparatus enables the plastic line to be readily fed through guide tubing, and manual manipulation of a portion of the guide tubing, to ensure sufficiently level winding. The apparatus is comprised of readily manufactured and available elements, and may be utilized by unskilled labor.

It will be obvious to those skilled in the art that various changes may be made without departing from the spirit of the invention, and therefore the invention is not limited to what is shown in the drawings and described in the specification but only as indicated in the appended claims.

I claim:

1. Winding apparatus comprising:

(a) means for rotatably supporting a supply reel,
(b) means for supporting and rotating a spool, and
(c) means for guiding a line drawn from said supply reel and wound on said spool comprising:
   (i) tube means having a fixed inlet end and a discharge end, and
   (ii) means for supporting the discharge end of said tube means for movement generally parallel to the axis of the spool.

2. Winding apparatus according to claim 1, said tube means comprising guide tube means and terminal tube means, said terminal tube means comprising said discharge end, said discharge end supporting means comprising means connecting said guide tube means and said terminal tube means.

3. Winding apparatus according to claim 2, wherein said connecting means comprises means for permitting rotational movement of said terminal tube means relative to said guide tube means.

4. Winding apparatus according to claim 3, said connecting means further comprising means for adjusting the frictional forces between said guide tube means and said terminal tube means.

5. Winding apparatus according to claim 2, wherein said terminal tube means opposite said discharge end having a flared end, and wherein said connecting means comprises threaded connecting means engaging said flared end.

6. Winding apparatus according to claim 1, said apparatus further including a platform, said means for rotatably supporting a supply reel and said means for supporting and rotating a spool being mounted on the upper surface of said platform.

7. Winding apparatus according to claim 6, said tube means comprising guide tube means extending downwardly through said platform adjacent said means for rotatably supporting a supply reel, and thence extending beneath the platform away from said supply reel supporting means.

8. Winding apparatus according to claim 7, said guide tube means including a terminal tube of arcuate shape, said terminal tube having an inlet end beneath said platform and coaxial with said guide tube means beneath the platform and having said discharge end above said platform and directed towards a spool supported by said spool supporting means.

9. Winding apparatus according to claim 8, wherein the means for supporting the discharge end of said tube means comprises means for rotatably coupling the inlet end of said terminal tube means and the forward end of said guide tube means.

10. Winding apparatus according to claim 6, said tube means including guide tube means extending beneath said platform and having an inlet adjacent said supply reel support means, and arcuate terminal tube means, said terminal tube means including said discharge end, and said supporting means comprising a coupling for supporting the end of said terminal tube means opposite the discharge end thereof.

11. Winding apparatus according to claim 1, said tube means comprising an arcuate terminal tube having an inlet end and said discharge end, said discharge end supporting means comprising means for supporting said inlet end for rotational movement about an axis extending transversely of a plane containing the axis of said take-up spool.

12. Winding apparatus comprising:
(a) a platform,
(b) means on said platform for rotatably supporting a supply reel,
(c) means on said platform for releasably axially clamping and axially rotating a take-up spool,
(d) guide tube means for guiding a line for level winding on said take-up spool comprising an inlet end and a discharge end,
(e) means for supporting said discharge end for manual movement thereof generally parallel of the axis of the take-up spool, and
(f) means for supporting said guide tube means to prevent translational movement of the inlet end thereof.

* * * * *